(12) United States Patent
Kobayashi

(10) Patent No.: US 7,658,256 B2
(45) Date of Patent: Feb. 9, 2010

(54) IMPACT DETECTION SENSOR ATTACHMENT STRUCTURE FOR MOTORCYCLE

(75) Inventor: Yuki Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 216 days.

(21) Appl. No.: 11/514,212

(22) Filed: Sep. 1, 2006

(65) Prior Publication Data
US 2007/0051551 A1 Mar. 8, 2007

(30) Foreign Application Priority Data
Sep. 6, 2005 (JP) .............................. 2005-257984

(51) Int. Cl.
*B60K 28/10* (2006.01)
(52) U.S. Cl. .................................... 180/274
(58) Field of Classification Search ................ 180/219, 180/271, 274
See application file for complete search history.

(56) References Cited

U.S. PATENT DOCUMENTS

| 4,766,982 | A | * | 8/1988 | Hayashi et al. ......... 188/181 A |
| 4,989,922 | A | * | 2/1991 | Pickenhahn et al. ......... 303/137 |
| 6,908,103 | B2 | * | 6/2005 | Umeda et al. ............ 280/730.1 |
| 7,322,437 | B2 | * | 1/2008 | Toyoda ....................... 180/219 |
| 7,425,009 | B2 | * | 9/2008 | Namazue et al. ............ 280/279 |
| 2005/0230940 | A1 | * | 10/2005 | Alexander et al. ........ 280/730.1 |
| 2005/0247499 | A1 | * | 11/2005 | Toyoda ....................... 180/219 |

FOREIGN PATENT DOCUMENTS

| DE | 8508646 | U1 | 6/1985 |
| DE | 19913906 | A1 | 10/1999 |
| DE | 10228264 | A1 | 1/2004 |
| DE | 10238526 | A1 | 3/2004 |
| JP | 11-278342 | A | 3/1998 |
| JP | 11278342 | A | * 10/1999 |
| JP | 2003-306184 | A | 10/2003 |

* cited by examiner

*Primary Examiner*—Paul N Dickson
*Assistant Examiner*—Robert A Coker
(74) *Attorney, Agent, or Firm*—Birch, Stewart, Kolasch & Birch, LLP.

(57) ABSTRACT

Impact detection sensors are disposed with ease for coping with an oblique collision or the like. A front wheel is disposed between left and right forks and supported by an axle. Main sensors are attached to the left and right forks at respective positions near and above the axle so as to be symmetrical. Thus, the main sensors detect impacts resulting from front and oblique collisions. In addition, backup sub-sensors are attached to the left and right front forks at respective positions above the corresponding main sensors so as to be symmetrical. This makes it possible to dispose the impact detection sensors at sensitive positions with ease while eliminating a steering component.

24 Claims, 8 Drawing Sheets

IMPACT DETECTION SENSOR ATTACHMENT STRUCTURE FOR MOTORCYCLE

CROSS-REFERENCE TO RELATED APPLICATIONS

The present application claims priority under 35 USC 119 to Japanese Patent Application No. 2005-257984 filed on Sep. 6, 2005 the entire contents of which are hereby incorporated by reference.

BACKGROUND OF THE INVENTION

1. Field of the Invention

The present invention relates to an impact detection sensor attachment structure for a motorcycle.

2. Description of Background Art

A motorcycle is known that includes an impact detection sensor for detecting an impact when an airbag is expanded in response to a predetermined impact. This impact detection sensor is disposed in the axle of a front wheel at a position near a steering axis. See, for example, Japanese Patent Laid-Open No. Hei 11-278342.

In the conventional example, the impact detection sensor is disposed in the axle cylinder and on the center of the vehicle body. More specifically, the impact detection sensor is disposed near the steering axis. Therefore, the sensor can sensitively detect the impact resulting from a front collision that is transmitted from the front wheel via the axle while eliminating a steering component. On the other hand, with regard to an oblique collision in which an impact may be applied to a front fork directly, i.e., an impact without firstly involving the axle, it is likely that the impact detection sensor is reduced in sensitivity due additionally to the displacement of the front wheel resulting from the turning of the front wheel. This may lead to an idea of locating the impact detection sensor at a place that is different from the axle. In this case, however, the impact detection sensor has to be located at a place where the front collision or the oblique collision can be detected sensitively. In addition, if the sensor is located apart from the steering axis, consideration should be made to effectively eliminate the steering component.

Taking into account a backup for a failure, it could be conceivable that impact detection sensors are arranged so as to combine a main sensor and a sub-sensor. In this case, a need arises to easily and preferably arrange a larger number of sensors.

SUMMARY AND OBJECTS OF THE INVENTION

Accordingly, it is an object of the present invention to attach impact detection sensors so as to achieve such demands.

In order to solve the above-mentioned problems, according to an embodiment of the present invention, an impact detection sensor for a motorcycle is provided wherein an impact detection sensor attachment structure is provided for a motorcycle for supporting a front wheel between a pair of left and right front forks via an axle with respective impact detection sensors being disposed on the left and right front forks.

According to an embodiment of the present invention, the impact detection sensors includes main sensors for mainly detecting a collision and sub-sensors for backing up the main sensors. The respective main sensors are disposed on the left and right front forks on the respective leading end sides thereof and the respective sub-sensors are disposed on the left and right front forks at respective positions above the main sensors.

According to an embodiment of the present invention, the impact detection sensors include main sensors for mainly detecting collision and a sub-sensor for backing up the main sensors, the respective main sensors are disposed on the left and right front forks on the respective leading end sides thereof, and the sub-sensor is disposed on a cross member for connecting the left and right front forks at a position above the front wheel.

According to an embodiment of the present invention, the sub-sensor is positioned on the center of a vehicle body.

According to an embodiment of the present invention, the impact detection sensors attached to the left and right front forks are disposed symmetrically with respect to the center of a vehicle body.

According to an embodiment of the present invention, the impact detection sensors are disposed above the axle of the front wheel.

According to an embodiment of the present invention, since respective impact detection sensors are disposed on the left and right front forks, not only the front collision which transmits impact from the front wheel to the front forks via the axle, but also the oblique collision which first transmits impact to the front forks, can be sensitively detected. In addition, since respective impact detection sensors are disposed on the left and right front forks, steering components can be effectively eliminated.

According to an embodiment of the present invention, since the impact detection sensors include main sensors and sub-sensors, the main sensors mainly detect impact and the sub-sensors back up the main sensors. In addition, since the left and right main sensors are disposed on the leading end sides of the front forks, they can sensitively detect collision. The main sensors are disposed at the lower portions of the left and right front forks and the sub-sensors are disposed at the upper portions of the left and right front forks. Therefore, the sub-sensors are disposed on the left and right side, whereby the steering component can be eliminated effectively as with the main sensors.

According to an embodiment of the present invention, since the sub-sensor is disposed on a cross member that connects the left and right front forks at a position above the front wheel, the sub-sensor can be a single member, whereby the number of sensors to be used can be reduced and arrangement so that the sensor can be facilitated.

According to an embodiment of the present invention, since the sub-sensor is disposed on the center of a vehicle body, it can be brought to a position near the steering axis, whereby the effect of steering can be reduced even if the sub-sensor is used independently.

According to an embodiment of the present invention, since the respective impact detection sensors are disposed on the left and right front forks so as to be symmetrical with respect to the center of the vehicle body, the steering component can be properly eliminated.

According to an embodiment of the present invention, since the impact detection sensors are disposed above the axle of the front wheel, collision can be sensitively detected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
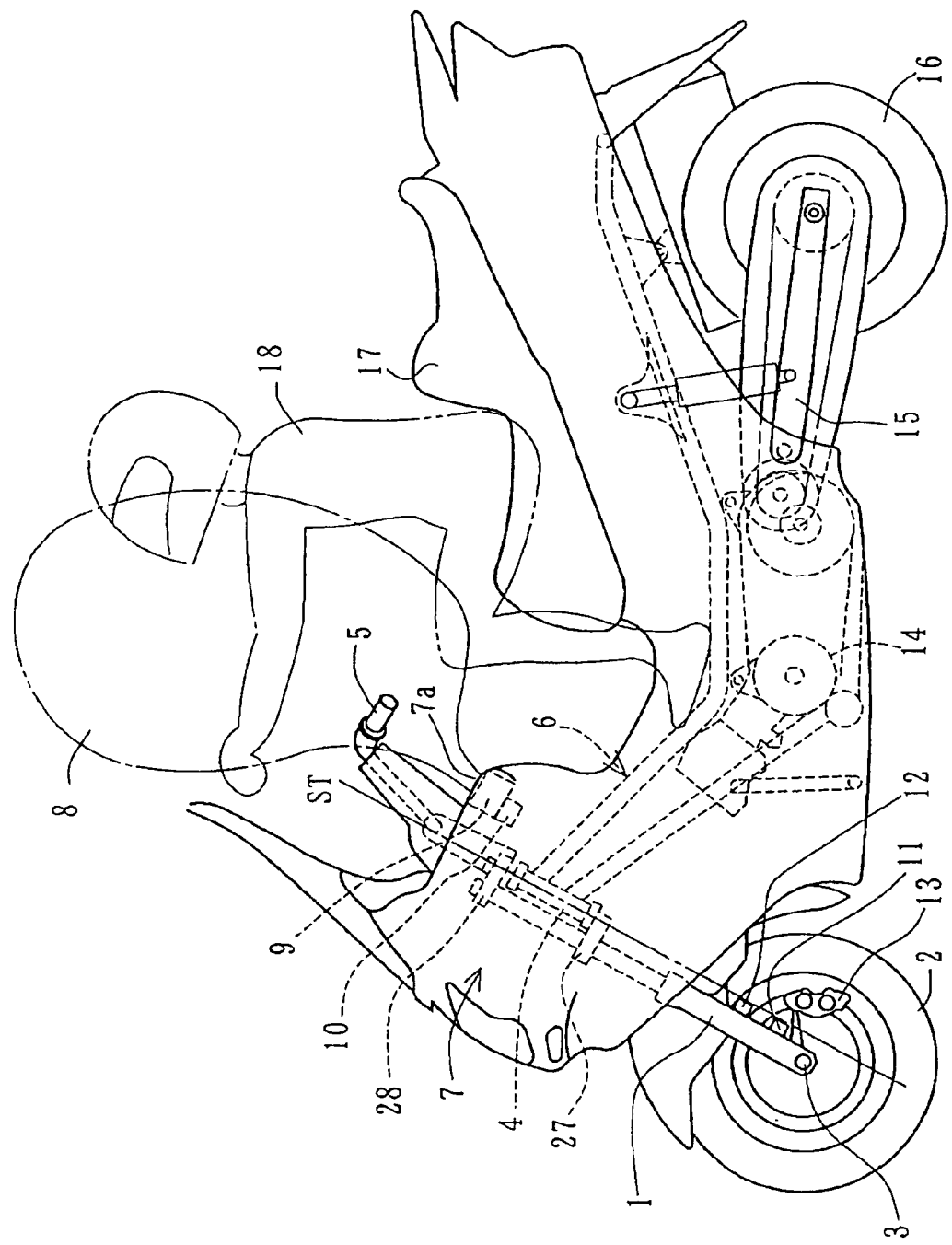
FIG. 1 is a side view of a motorcycle according to the present invention.

A first embodiment will be described with reference to the drawings wherein FIG. 1 is a side view of a scooter type motorcycle according to the present invention. Left-hand and right-hand front forks 1 are of the known telescopic type and are provided to extend obliquely upwardly and are inclined rearwardly. A front wheel 2 is supported between the lower ends of the front forks 1 via an axle 3. The upper portion of the axle 3 is turnably held by a head pipe 4 and the front wheel 2 is steered by a handlebar 5. Symbol ST denotes a steering axis.

A body frame 6 that provided with the head pipe 4 at its front end is covered by a body cover 7. An air bag module 9 for storing an air bag 8 therein in a folded state is attached to a front upper portion 7a of the body cover 7 near the handlebar 5. The expansion of the air bag 8 is controlled by an operation controller 10 attached to the air bag module 9.

The operation controller 10 judges whether to expand the air bag 8 or not to expand the air bag 8 on the basis of impact signals detected by main sensors 11 and sub-sensors 12 attached to the front forks 1. If collision is judged on the basis of the impact signals, the air bag 8 is rapidly expanded by a high-pressure gas in such a manner so as to be denoted with an imaginary line.

In FIG. 1, a brake caliper 13, a power unit 14, a rear arm 15, a rear wheel 16 and a seat 17 are provided. The seat 17 shown in the FIG. 1 is a double-seat, in which an operator 18, as an occupant of the front seat, is a target protected by the expanded air bag 8.

Figure 2:
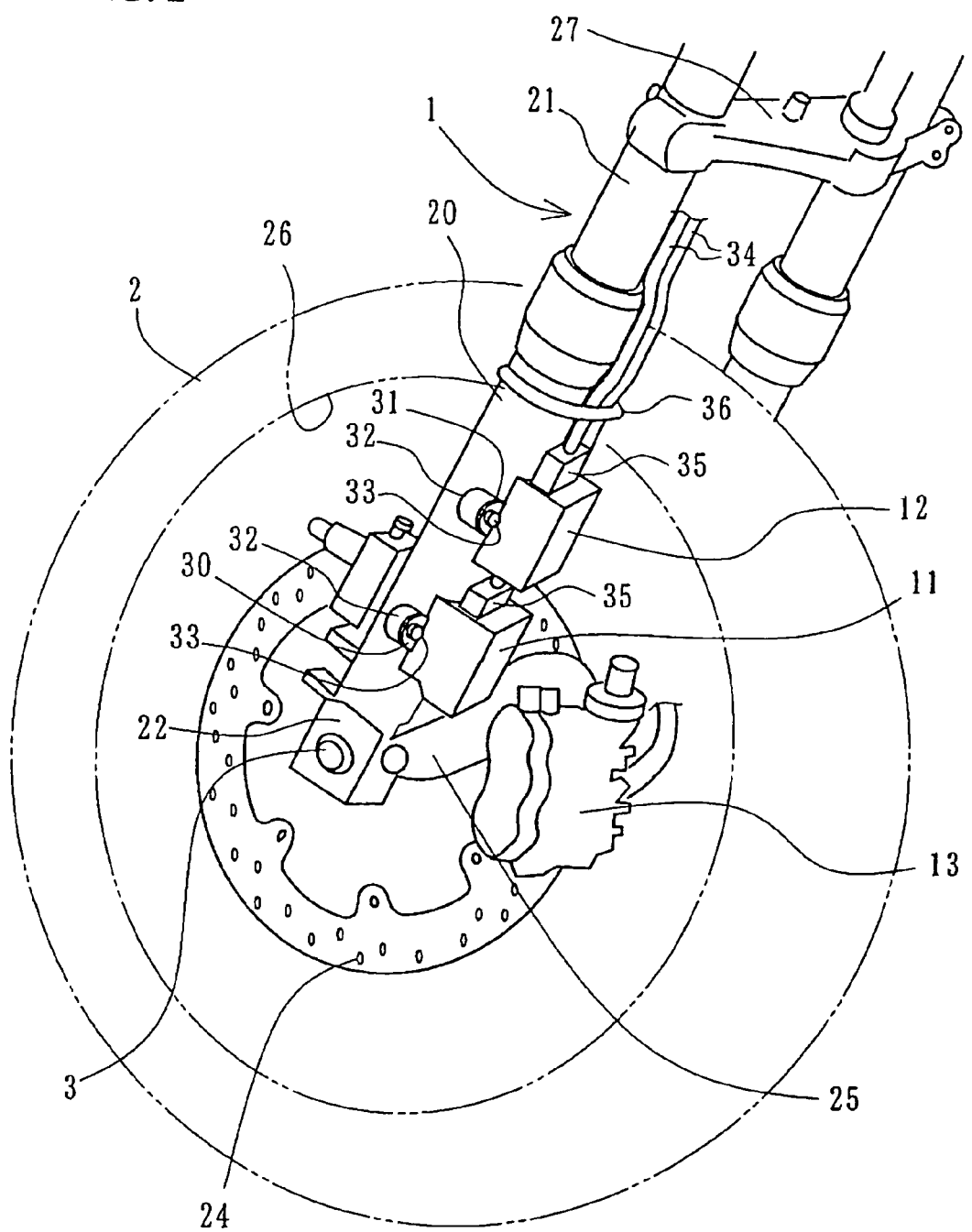
FIG. 2 is an enlarged side view of a front wheel portion of a first embodiment.

FIG. 2 is an enlarged side view illustrating a portion of the front wheel 2. The front fork 1 is of an inner-outer double cylinder type including a bottom case 20 and an inner tube 21. The lower end of the bottom case 20 serves as a support portion 22 for the axle 3. The main sensor 11 is attached to the bottom case 20 at a position above and near the support portion 22 so as to project rearwardly therefrom. The position to which the main sensor 11 is attached is such that collision can be detected with high sensitivity.

The brake caliper 13 is disposed rearwardly of the main sensor 11 so as to be in slidable contact with a brake disk 24. The brake caliper 13 is held by a caliper stay 25 projecting rearwardly from the axle 3. Thus, the main sensor 11 is protected from scattering stones or the like by the brake caliper 13 and the caliper stay 25.

The sub-sensor 12 is attached to a portion of the bottom case 20 also on the rear side thereof and above the caliper stay 25. The upper end of the sub-sensor 12 is positioned inside a rim 26 of the front wheel 2. This position is such that sensitivity to impact detection is equal to that of the main sensor 11. In addition, as with the main sensor 11, the sub-sensor 12 is protected from scattering stones or the like by the brake caliper 13 and the caliper stay 25. In the FIG. 2, a bottom bridge 27 is provided and as illustrated in FIG. 1, a top bridge 28 is provided.

The main sensor 11 and the sub-sensor 12 are provided at its sides with respective flanges 30 and 31, which are removably attached, with bolts 33, to bosses 32 joined integrally to the bottom case 20. Signal lines 34 are provided with one end being connected to an upper portion of the sub-sensor 12 via a coupler 35. This applies to the side of the main sensor 11. The signal lines 34 are restrained to the bottom case 20 with a clip 36.

Figure 3:
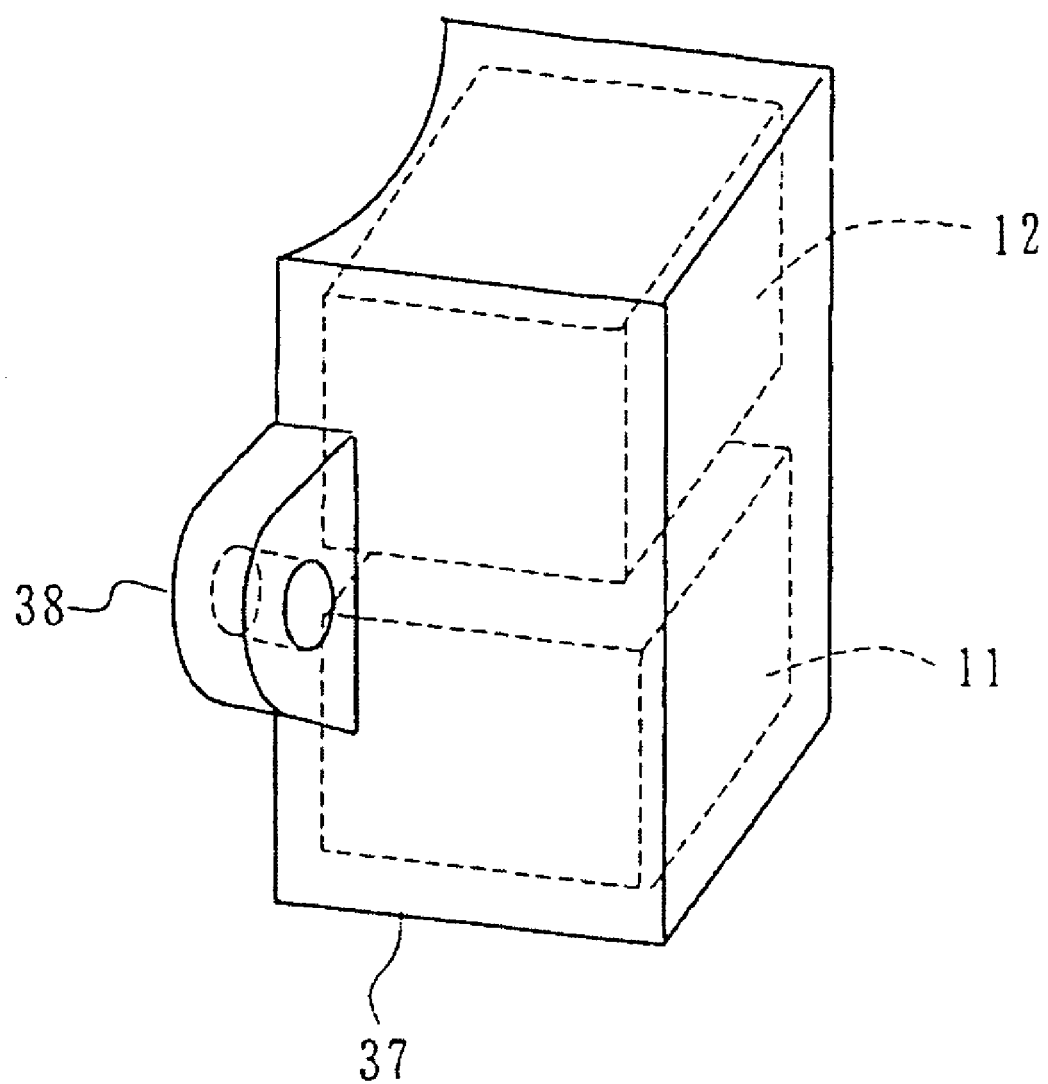
FIG. 3 is a modified example relating to attachment of impact sensors.

In addition, as illustrated in FIG. 3, a main sensor 11 and a sub-sensor 12 are housed in a common case 37 on lower and upper sides thereof, respectively. A flange 38 is provided on a side portion, which is located near an opening of the case 37, and is removably attached to the boss 32 of the bottom case 20 with a bolt 33 (see FIG. 2). This configuration can reduce the number of attachment places and the number of man-hours. Alternatively, a main sensor 11 and a sub-sensor 12 may be housed in respective separate cases for attachment.

Figure 4:
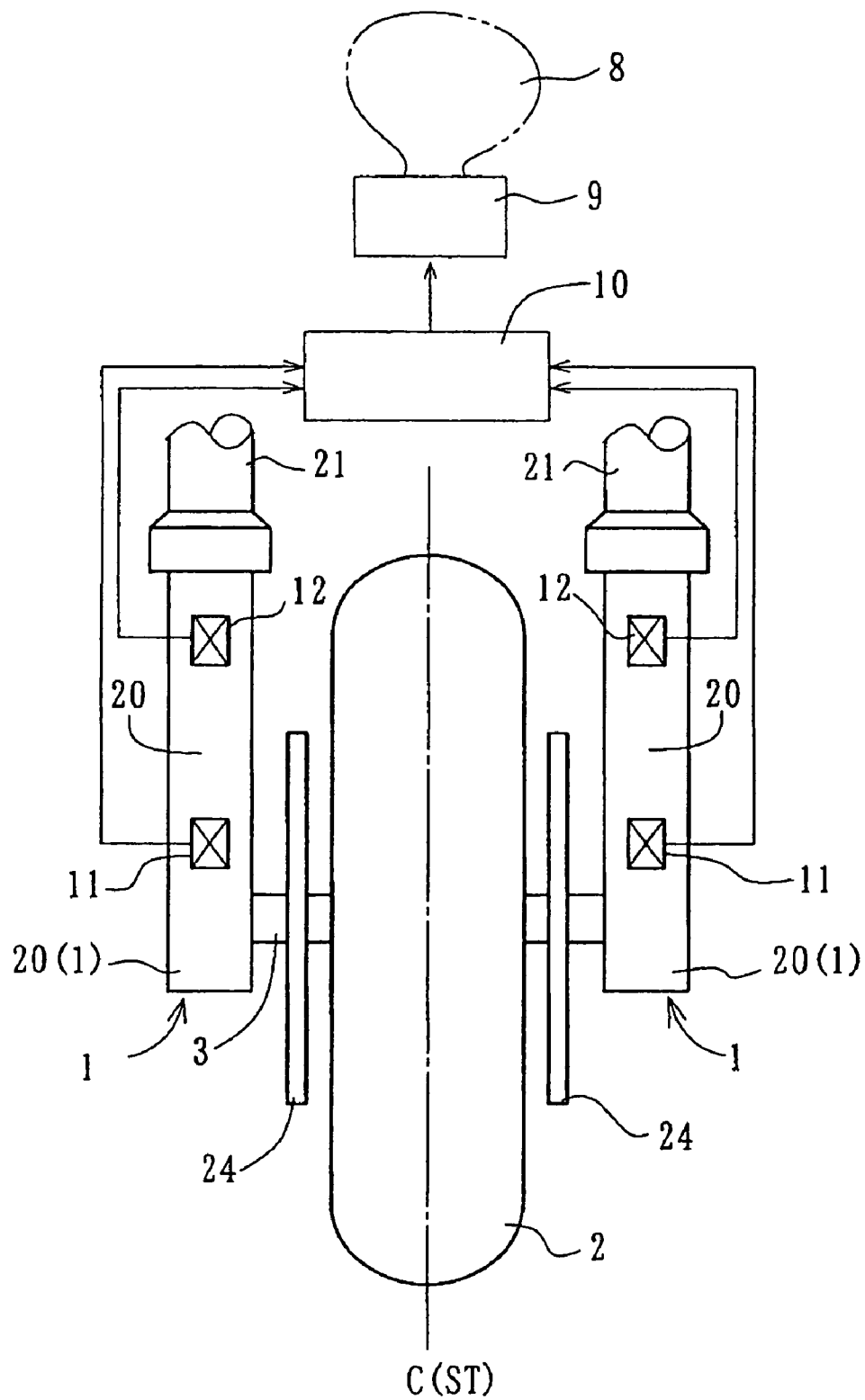
FIG. 4 is a schematic diagram of the front wheel portion as viewed from the front of a vehicle body.

FIG. 4 is a schematic diagram illustrating the front wheel 2 and its periphery as viewed along the back-and-forth direction of the vehicle body. In FIG. 4, the body centerline C is coincident with the steering axis ST and passes through a laterally intermediate point of the axle 3, i.e., a center of the vehicle body. The main sensors 11 are attached to the left and right front forks 1, 1 at respective positions near and above the axle 3 in such a manner so as to be symmetrical with respect to the body centerline C (the steering axis ST).

The sub-sensors 12 are attached to the associated front forks 1, 1 at respective positions above the main sensors 11 and slightly lower than the upper end of the front wheel 2 in such a manner so as to also be symmetrical with respect to the steering axis ST.

The main sensor 11 and the sub-sensor 12 are each a known impact detection sensor of an acceleration detection type. The main sensors 11 are disposed near the axle 3 for mainly detecting impacts in various directions at the time of collision such as a front collision or the like and output the detection to the operation controller 10. An object of the sub-sensor 12 is to back up the main sensor 11 in case of the main sensor 11 fails or the like. The sub-sensor 12 sends a detection signal resulting form a collision to the operation sensor 10.

The operation controller 10 determines whether or not an impact is a collision on the basis of the detection signals of the left and right main and sub-sensors 11, 12.

Figure 10:
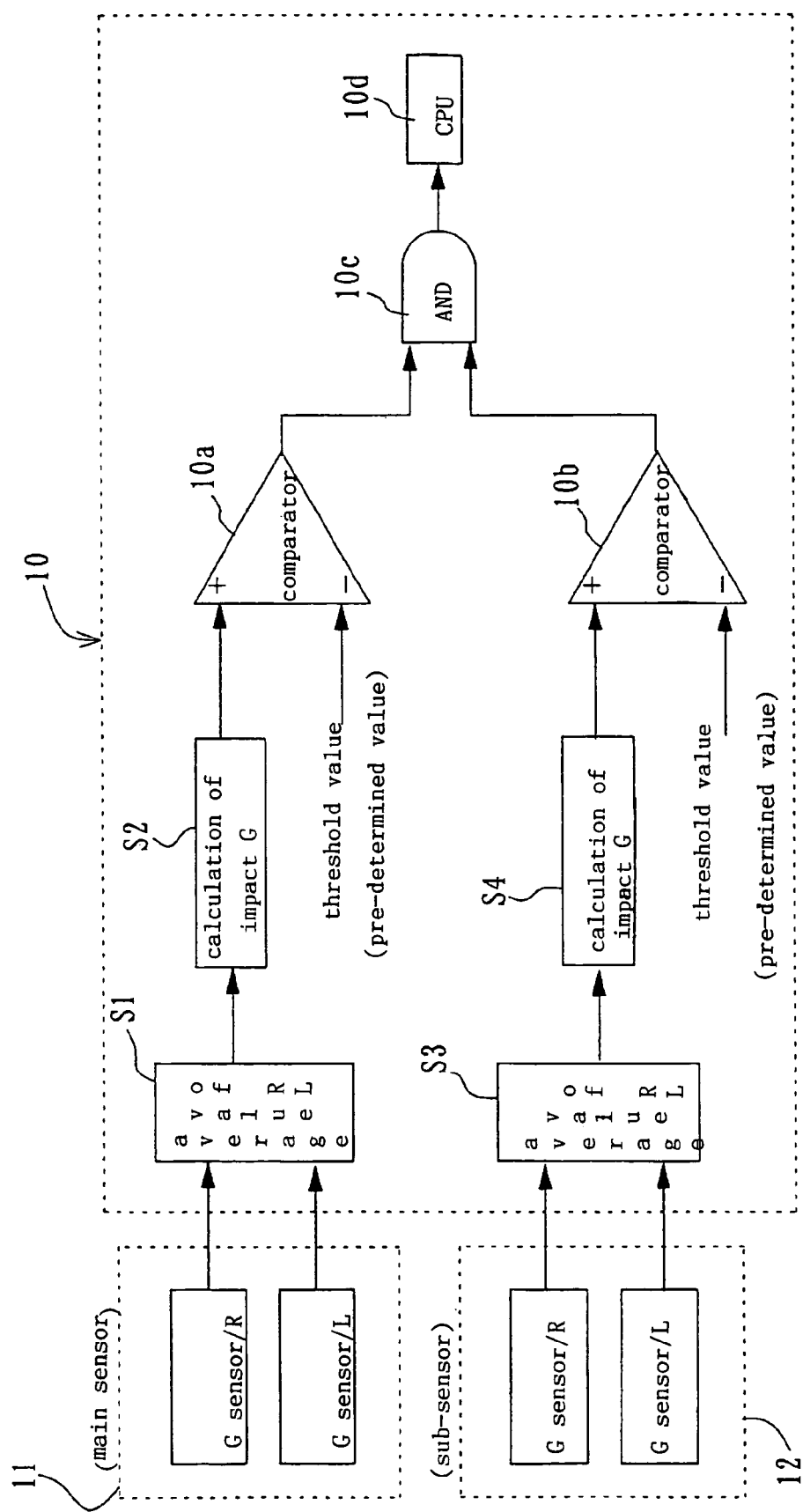
FIG. 10 is a flow chart illustrating how an operation controller judges collision.

FIG. 10 is a flow chart for illustrating how the operation controller 10 judges a collision. Incidentally, although FIG. 10 illustrates a collision judgment process of the first embodiment, when a single sub-sensor 12 is used as in a second and a third embodiment described later, this collision judgment process applies to main sensors 11 and an averaging process described later that is subjected to the sub-sensor 12 is omitted.

Referring to FIG. 10, detection signals from the left and right main sensors 11 (hereunder, referred to as the G sensor/L and G sensor/R) are supplied to the operation controller 10, in which at first the left and right detection values are averaged (S1). The purpose of this averaging is to eliminate a steering component, that is, to cancel an impact G that is caused when the steering shaft or the like hits against a handlebar stopper during steering.

Next, the impact G (acceleration upon the collision, the same holds true of the following) is calculated based on the averaged value (S2). Then, this calculation result is compared with a preset threshold value by a comparator 10a. If the calculation of the impact G is greater than the threshold value, a plus (+) comparative signal is outputted to an AND element 10c. If not, a minus (−) comparative signal is outputted to the AND element 10c.

On the other hand, the detection signals of the left and right sub-sensors 12 (hereunder, referred to as the G sensor/L and the G sensor/R) are also supplied to the operation controller 10, in which similarly the left and right detection signals are averaged (S3). Then, the impact G is calculated based on the averaged value (S4). Then, this calculation result is compared with a preset threshold value by a comparator 10b. The comparative result is processed in the same manner. If the calculated impact (G) is greater than a threshold value, a plus (+) comparative signal is outputted to the AND element 10c. If not, a minus (−) comparative signal is outputted to the AND element 10c.

The respective comparative values of the main sensors 11 and the sub-sensors 12 are judged by the AND element 10c. Only if both the comparative values are plus (+), collision is determined and a collision signal is supplied to a CPU 10d. At this time, the CPU 10d issues an operation instruction to expand the air bag 8. If at least one of the comparative values is not plus (+), the collision is not determined, so that the collision signal is not supplied.

In addition, the detection signals of the left and right main sensors 11 may significantly differ from each other. While detection signals are inputted from the sub-sensors 12, detection signals may be not inputted from the main sensors 11 or the detection signals from the main sensors 11 may be very small. In such predetermined situations, an error judgment process, not shown, that is different from the process of the flow chart in FIG. 10 makes a judgment that the main sensors 11 are in trouble. In addition, collision is determined based on the detection signals of the sub-sensors 12 without the use of the detection signals from the main sensors 11. This means that the sub-sensors 12 function as a backup for the main sensors 11.

The function of the present invention will be next described. When an impact resulting from a front collision or the like is transmitted from the front wheel 2 via the axle 3 to the front folks 1, the main sensors 11 detect the impact and transmit detection signals to the operation controller 10. The main sensors 11 are attached to positions that are in the vicinity of the front forks 1 and above the axle 3 and that are most sensitive to the collision. Therefore, the main sensors 11 can detect the front collision most sensitively.

Even if the front forks 1 first receive an impact resulting from an oblique collision, the main sensors 11 can detect the impact since they are disposed on the front forks 1. In addition, since the main sensors 11 are disposed on the left and right front forks 1 so as to be symmetric with respect to the steering axis ST, they can eliminate a steering component from even an oblique collision, thereby achieving sensitive detection.

Thus, not only a front collision which transmits an impact from the front wheel 2 to the front forks 1 via the axle 3, but also an oblique collision which first transmits impact to the front forks 1, can be detected sensitively. In addition, since the main sensors 11 and the sub-sensors 12, which are impact detection sensors, are disposed symmetrically on the associated left and right front forks 1, the respective steering components of the main and sub-sensors 11 and 12 can be eliminated effectively.

Figure 5:
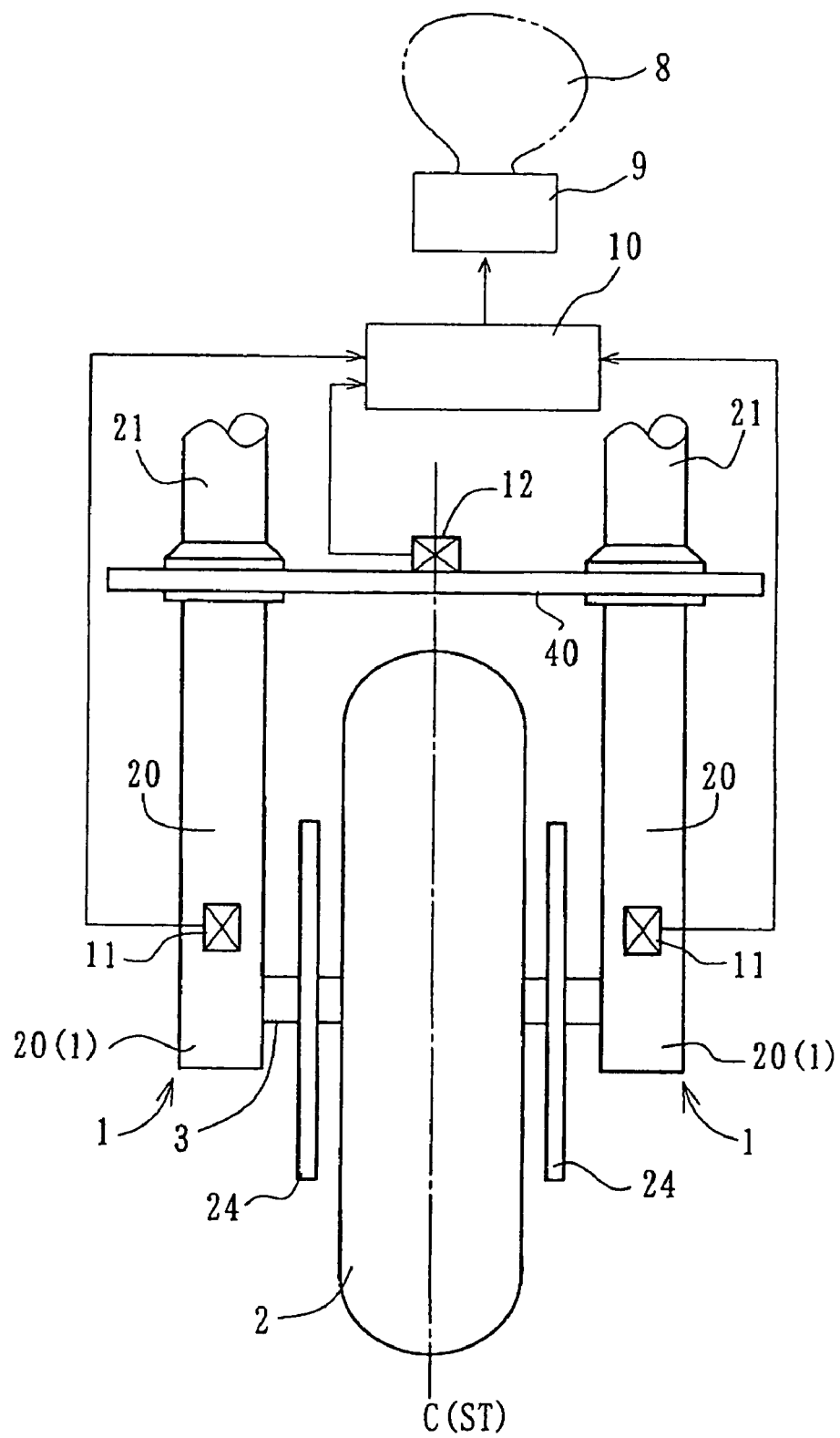
FIG. 5 is a schematic diagram relating to a second embodiment similarly to FIG. 4.

FIG. 5 is a diagram relative to a second embodiment and similar to FIG. 4. Note that common reference numerals are assigned to portions common to those of the first embodiment and a duplicated explanation will be omitted as much as possible. In this embodiment, only one sub-sensor 12 is attached to the laterally intermediate portion of a cross member 40, which is spanned between left and right front forks 1, 1. The sub-sensor 12 is disposed on the vehicle body centerline C (the steering axis ST).

The cross member 40 is disposed at a position slightly above and near the upper end of the front wheel 2. In addition, the cross member 40 is joined to the left and right front forks 1 to serve as a reinforcement for the front forks 1. The bottom bridge 27 (FIG. 2) can be substituted for the cross member 40.

In this way, the sub-sensor 12 is disposed on the vehicle body centerline C at the laterally intermediate portion of the cross member 40, that is, disposed in the vicinity of the steering axis ST. Therefore, the effect of steering on the sub-sensor 12 can be minimized. In addition, since the number of sub-sensors to be used can be reduced to only one, it is possible to reduce the number of sub-sensors and the cost.

In addition, it is possible not to dispose the sub-sensor 12 on the vehicle body centerline C. In this case, if it is not necessary to take into account the effect of steering, only one sub-sensor 12 can be used. If it is intended to eliminate a steering component, two sub-sensors should be provided to be symmetrical. In any case, one or two sub-sensors can be freely disposed on the cross member 40 by using the fully lateral width thereof; therefore, a degree of freedom of arrangement can be enhanced.

Figure 6:
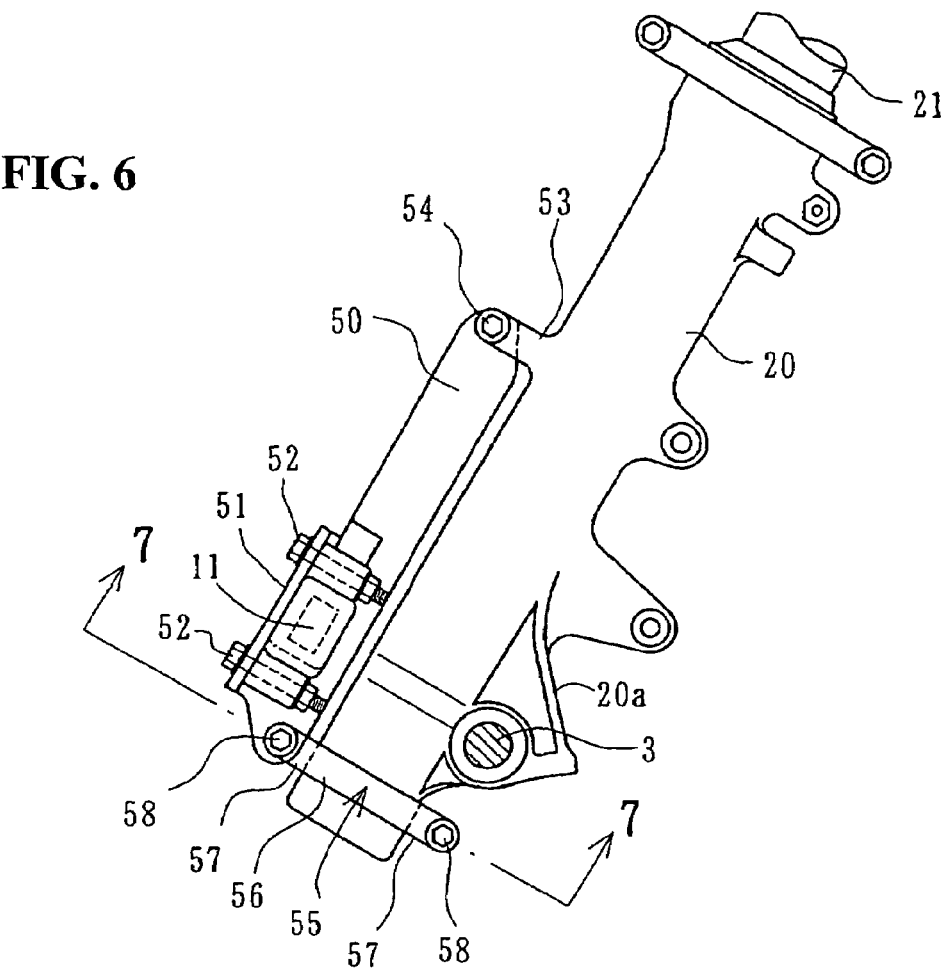
FIG. 6 is a side view of a bottom case according to a third embodiment.

FIGS. 6 to 9 relate to a third embodiment in which only sub-sensor 12 is to be used, which is similar to the second embodiment of FIG. 5. FIG. 6 is a side view of a bottom case 20 of a front fork 1. A support plate 50 that is elongated in the up-and-down direction is disposed on the front side of the bottom case 20. The support plate 50 is provided at its lower portion with a flange 51 integrally thereto. A main sensor 11 is attached to the flange 51 with bolts 52 so as to be covered from the front by the flange 51.

The support plate 50 is laterally connected at its upper portion to a boss 53 with a bolt 54. The boss 53 is integrally formed to project from the upper front surface of the bottom case 20. In addition, the support plate 50 is fixed at its lower portion to the lower end portion of the bottom case 20 with a fixing band 55 which winds around the bottom case 20. An axle holder 20a is provided which projects rearwardly from the bottom case 20 to hold the axle 3.

Figure 7:
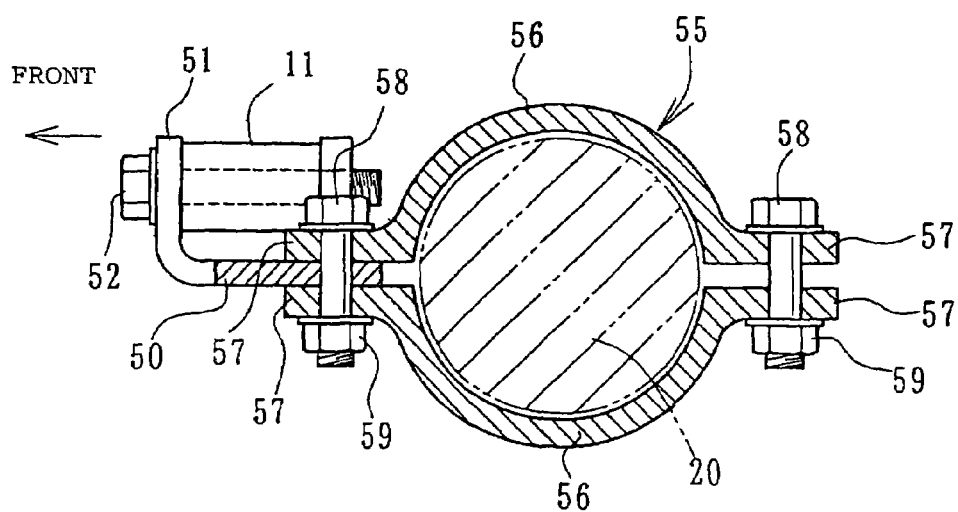
FIG. 7 is a cross-sectional view taken along line 7-7 of FIG. 6.

As shown in FIG. 7, the fixing band 55 is composed of a pair of semicircular members facing each other. The semicircular members have arc-shape portions 56 which wind around the lower end portion of the bottom case 20 with each having front and rear end portions 57 which extend radially outwardly. Of the front and rear end portions 57, the front end portions 57 hold the lower portion of the support plate 50 therebetween by co-fastening them with a bolt 58 and a nut 59. In addition, the rear end portions 57 are directly fastened by a bolt 58 and a nut 59. If there is no appropriate boss 53 on the upper portion of the bottom case, then the support plate 50 may also be fixed at its upper portion with a fixing band 55.

In this case, the flange 51 is bent laterally at an almost a right angle. The main sensor 1 is covered by the flange 51 from the front side, the support plate 50 from the inside and the bottom case 20 from the rear side. Thus, the main sensor 11 can be protected from scattering stones or the like more reliably. Accordingly, even if the main sensor 11 cannot be attached to a portion on the back side of the bottom case 20 because the axle holder 20a is provided at that portion, then a support portion for the main sensor 11 can easily be provided on the front side of the bottom case 20.

Figure 8:
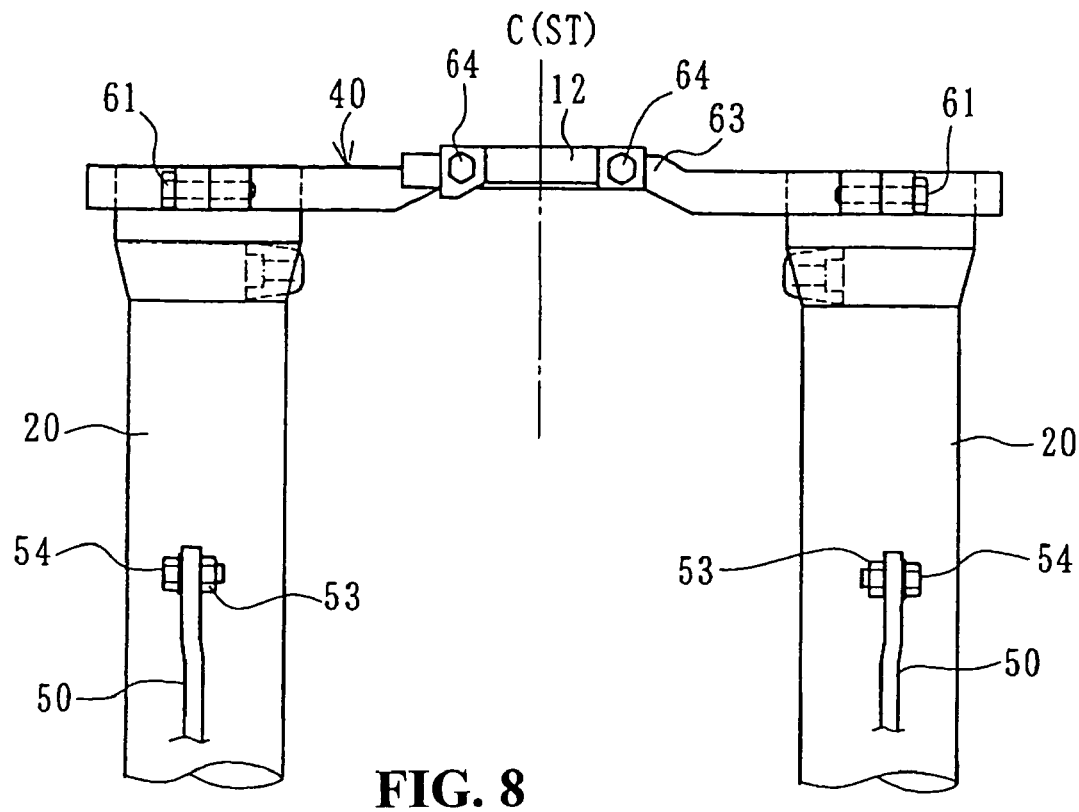
FIG. 8 is a front view of the bottom case.
Figure 9:
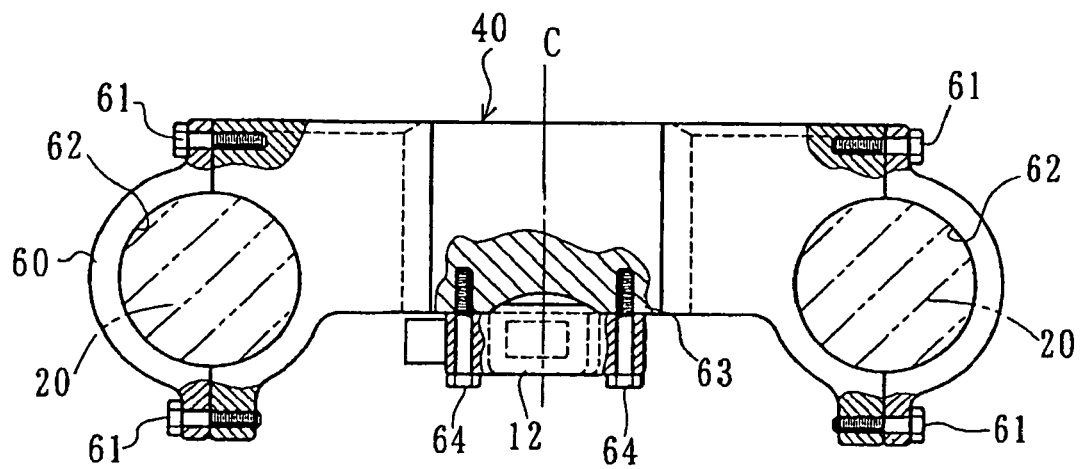
FIG. 9 is a top view of the bottom case.

FIG. 8 is a front view of left and right bottom cases 20 and FIG. 9 is a plan view thereof. In FIGS. 8 and 9, respective semicircular brackets 60 are laterally fastened to the left and right ends of a cross member 40 with bolts 61 to form mount holes 62 (FIG. 9). Bottom cases 20 are inserted into the respective mount holes 62, and the cross member 40 is joined to the outer circumferential portions of upper end enlarged-diameter parts of the bottom cases 20.

The sub-sensor 12 is removably attached to the front end face center 63 of the cross member 40 from the front with bolts 64 so as to be long sideways. In this case, the sub-sensor 12 is disposed to be long from side to side, crossing the vehicle body centerline C, so that a longitudinally intermediate portion of the sub-sensor 12 coincides with the vehicle body centerline C. The front end face center 63 of the front portion of the cross member 40 is recessed rearwardly in a single-stepwise, so that the sub-sensor 12 is covered from its right-hand and left-hand sides by the respective front half portions of the brackets 60.

Since the main sensors 11 and the sub-sensor 12 are provided in this way, the same effect as that of the embodiment described earlier can be produced. In addition, the sensors can be attached easily and protectively while effectively utilizing the peripheral members thereof for the attachment.

It is to be noted that the present invention should not be restricted to the embodiments described above and can be varied or modified in various ways within the principle of the invention. For instance, a large noise may occur that the main sensor 11 may detect as a collision when the front wheel 2 runs over a bump. Even in such a case, if the sub-sensor 12 is attached to a position where its sensitivity is slightly lower than that of the main sensors 11, although the main sensors 11 detect the noise encountered when the front wheel runs over a bump, a collision is not judged unless the sub-sensor 12 detects the noise. The present invention can be applied to various types of motorcycles in addition to the scooter type motorcycles. The type of a front fork may be of an inverted type.

Further, the impact detection sensor of the present invention can be used for not only the judgment of airbag expansion but also, for example, the judgment of operation of the airbag jacket (operator-wearing airbag) or other similar devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An impact detection sensor attachment structure for a motorcycle supporting a front wheel between a pair of left and right front forks via an axle, comprising:
   respective impact detection sensors being disposed on rear sides of the left and right front forks; and
   a brake caliper held by a caliper stay in a position rearwardly with respect to the respective impact sensors,
   wherein the respective impact sensors are protected from scattering stones by the brake caliper and the caliper stay.

2. The impact detection sensor attachment structure for the motorcycle according to claim 1, wherein the impact detection sensors include main sensors that mainly detect collision and sub-sensors that back up the main sensors,
   the respective main sensors being disposed on the left and right front forks, and the respective sub-sensors being disposed on the left and right front forks at respective positions above the main sensors.

3. The impact detection sensor attachment structure for the motorcycle according to claim 2, wherein all of the impact detection sensors are disposed above the axle of the front wheel.

4. The impact detection sensor attachment structure for the motorcycle according to claim 1, wherein the impact detection sensors include main sensors that mainly detect collision and a sub-sensor that backs up the main sensors,
   the respective main sensors being disposed on the left and right front forks, and the sub-sensor being disposed on a cross member that connects the left and right front forks at a position above the front wheel.

5. The impact detection sensor attachment structure for the motorcycle according to claim 4, wherein the sub-sensor is positioned on the center of a vehicle body.

6. The impact detection sensor attachment structure for the motorcycle according to claim 4, wherein all of the impact detection sensors are disposed above the axle of the front wheel.

7. The impact detection sensor attachment structure for the motorcycle according to claim 1, wherein all of the impact detection sensors are disposed above the axle of the front wheel.

8. The impact detection sensor attachment structure for the motorcycle according to claim 1, wherein the respective impact detection sensors are provided at sides with left and right flanges which are removably attached, with bolts, to bosses joined integrally to bottom cases of the left and right front forks.

9. The impact detection sensor attachment structure for the motorcycle according to claim 1, wherein the impact detection sensors on the left and right sides of the motorcycle are housed, respectively, in left and right common cases,
   wherein each of the common cases includes a flange provided on a side portion, each of the flanges being removably attached via a bolt to a boss of the respective one of left and right bottom cases.

10. An impact detection sensor attachment structure for a motorcycle comprising:
   a left and right fork for supporting a front wheel via an axle;
   a first impact detection sensor being disposed on a rear side of the left fork for detecting a front and oblique collision; and
   a second impact detection sensor being disposed on a rear side of the right front fork for detecting a front and oblique collision; and
   a brake caliper held by a caliper stay in a position rearwardly with respect to each of the first and second impact sensors,
   wherein the first and second impact sensors are protected from scattering stones by the brake caliper and the caliper stay.

11. The impact detection sensor attachment structure for the motorcycle according to claim 10, wherein the first and second impact detection sensors are main sensors for mainly detecting a collision and sub-sensors for providing a back up for the main sensors, the respective main sensors being disposed on the left and right front forks, and the respective sub-sensors being disposed on the left and right front forks at respective positions above the main sensors.

12. The impact detection sensor attachment structure for the motorcycle according to claim 11, wherein all of the first and second impact detection sensors are disposed above the axle of the front wheel.

13. The impact detection sensor attachment structure for the motorcycle according to claim 10, wherein the first and second impact detection sensors include main sensors that mainly detect collision and a sub-sensor for backing up the main sensors, the respective main sensors being disposed on the left and right front forks, and the sub-sensor being disposed on a cross member that connects the left and right front forks at a position above the front wheel.

14. The impact detection sensor attachment structure for the motorcycle according to claim 13, wherein the sub-sensor is positioned on the center of a vehicle body.

15. The impact detection sensor attachment structure for the motorcycle according to claim 13, wherein all of the first and second impact detection sensors are disposed above the axle of the front wheel.

16. The impact detection sensor attachment structure for the motorcycle according to claim 10, wherein the first and second impact detection sensors attached to the left and right front forks are disposed symmetrically with respect to the center of a vehicle body.

17. The impact detection sensor attachment structure for the motorcycle according to claim 10, wherein all of the first and second impact detection sensors are disposed above the axle of the front wheel.

18. The impact detection sensor attachment structure for the motorcycle according to claim 10, wherein the first and second impact detection sensors are provided at sides with left and right flanges which are removably attached, with bolts, to bosses joined integrally to bottom cases of the left and right front forks.

19. The impact detection sensor attachment structure for the motorcycle according to claim 10, wherein the first and second impact detection sensors are housed, respectively, in left and right common cases, wherein each of the common cases includes a flange provided on a side portion, each of the flanges being removably attached via a bolt to a boss of the respective one of the left and right bottom cases.

20. An impact detection sensor attachment structure for a motorcycle supporting a front wheel between a pair of left and right front forks via an axle, comprising:

left and right impact detection sensors attached to the left and right front forks in positions that are disposed symmetrically with respect to a steering axis.

21. An impact detection sensor attachment structure for a motorcycle supporting a front wheel between a pair of left and right front forks via an axle, comprising:

left and right impact detection sensors disposed on the left and right front forks, wherein detection values from the left and right impact detection sensors are averaged.

22. An impact detection sensor attachment structure for a motorcycle supporting a front wheel between a pair of left and right front forks via an axle, comprising:

respective impact detection sensors being disposed on the left and right front forks, wherein the impact detection sensors include main sensors that mainly detect collision and sub-sensors that back up the main sensors, the respective main sensors being disposed on the left and right front forks on the respective leading end sides, and the respective sub-sensors being disposed on the left and right front forks at respective positions above the main sensors, wherein an upper end of each of the sub-sensors is positioned inside a rim of the front wheel when viewed in side view.

23. An impact detection sensor attachment structure for a motorcycle supporting a front wheel between a pair of left and right front forks via an axle, comprising:

respective impact detection sensors being disposed on the left and right front forks, wherein the impact detection sensors include main sensors that mainly detect collision and sub-sensors that back up the main sensors, the respective main sensors being disposed on the left and right front forks on the respective leading end sides, and the respective sub-sensors being disposed on the left and right front forks at respective positions above the main sensors, wherein an impact is determined to be a collision only when detection values of the impact detection sensors are all greater than a threshold value.

24. An impact detection sensor attachment structure for a motorcycle supporting a front wheel between a pair of left and right front forks via an axle, comprising:

left and right impact detection sensors being disposed on the left and right front forks, wherein the left and right impact detection sensors include main sensors that mainly detect collision and sub-sensors that back up the main sensors, the respective main sensors being disposed on the left and right front forks on the respective leading end sides, and the respective sub-sensors being disposed on the left and right front forks at respective positions above the main sensors, wherein when detection values of the left and right main sensors are different from each other, or when a detection value of one of the left and right main sensors is less than a predetermined value, the detection values of the main sensors are determined to be in error, and when the detection values of the main sensors are determined to be in error, an impact is determined to be a collision by the detection values of the sub-sensors.

* * * * *

UNITED STATES PATENT AND TRADEMARK OFFICE
CERTIFICATE OF CORRECTION

PATENT NO.      : 7,658,256 B2
APPLICATION NO. : 11/514212
DATED           : February 9, 2010
INVENTOR(S)     : Yuki Kobayashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Twenty-eighth Day of December, 2010

David J. Kappos
*Director of the United States Patent and Trademark Office*